United States Patent

Tino

[11] Patent Number: 5,978,017
[45] Date of Patent: Nov. 2, 1999

[54] MULTI-CAMERA VIDEO RECORDING SYSTEM FOR VEHICLES

[76] Inventor: Jerald N. Tino, 5509 21 St. Ct. W., Bradenton, Fla. 34207

[21] Appl. No.: 08/835,409

[22] Filed: Apr. 8, 1997

[51] Int. Cl.$^6$ ....................................................... H04N 7/18
[52] U.S. Cl. ............................ 348/148; 348/151; 348/159
[58] Field of Search ..................................... 348/148, 153, 348/159, 151, 161, 152, 156; 340/435, 937; 359/604, 896; H04N 7/18

[56] References Cited

U.S. PATENT DOCUMENTS

| | | | |
|---|---|---|---|
| 3,349,679 | 10/1967 | Lohman, III | 95/11 |
| 5,281,985 | 1/1994 | Chan | 353/13 |
| 5,289,321 | 2/1994 | Secor | 359/896 |
| 5,296,924 | 3/1994 | de Saint Blancard | 348/118 |
| 5,319,394 | 6/1994 | Dukek | 348/148 |
| 5,382,953 | 1/1995 | Hauptli | 340/937 |
| 5,570,127 | 10/1996 | Schmidt | 348/148 |
| 5,574,443 | 11/1996 | Hsieh | 340/901 |
| 5,680,123 | 10/1997 | Lee | 340/435 |
| 5,760,962 | 6/1998 | Schofield et al. | 359/604 |
| 5,793,420 | 8/1998 | Schmidt | 348/148 |

Primary Examiner—Howard Britton
Assistant Examiner—Tung Vo
Attorney, Agent, or Firm—Joseph N. Breaux

[57] ABSTRACT

A video recording system for vehicles including a video recorder having an electronic record control input port and a video signal input port; a four-to-one video multiplexer having four multiplexer video signal input ports and one multiplexer video signal output port, the multiplexer video signal output port being in transmitting connection with the video signal input port of the video recorder; an activation switch in electrical connection with the electronic record control input port of the video recorder; and a rear view mirror/camera assembly having four video cameras each with a wide angle fish-eye lens and a camera video signal output port in transmitting connection with one of the four multiplexer video signal input ports, one fish-eye lens being aimed toward the front of the vehicle, one fish-eye lens being aimed at the rear of the vehicle, one fish-eye lens being aimed at the driver seat portion of the passenger compartment, and one fish-eye lens being aimed at the front passenger seat portion of the passenger compartment, the four-to-one video multiplexer switching the camera video signals received at its four multiplexer video signal input ports sequentially to the multiplexer video signal output port in response to an activation signal from the activation switch to the video recorder control input port.

3 Claims, 2 Drawing Sheets

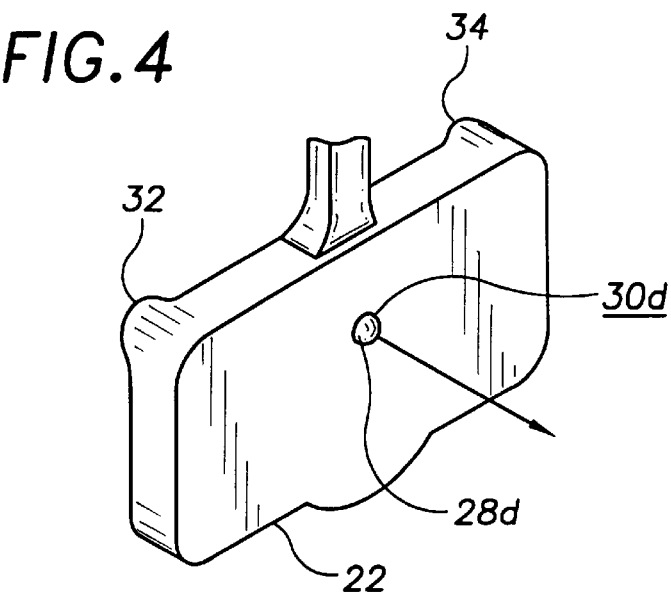
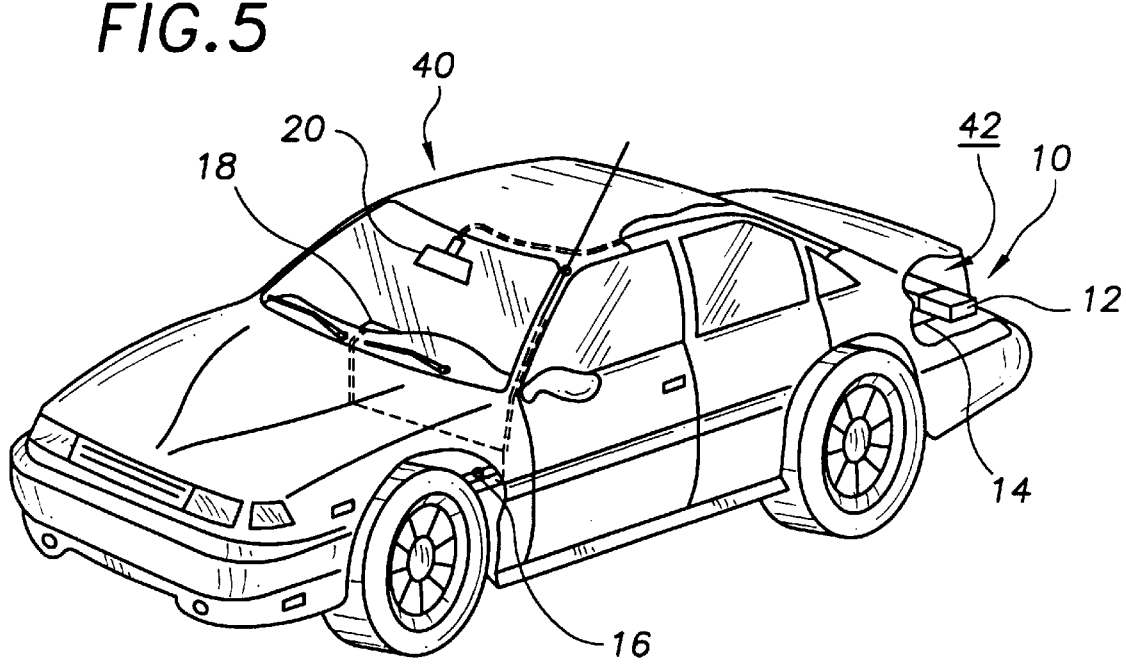

5,978,017

MULTI-CAMERA VIDEO RECORDING SYSTEM FOR VEHICLES

TECHNICAL FIELD

The present invention relates to vehicle security devices and systems and more particularly to a video recording system for vehicles that includes a video recorder having an electronic record control input port and a video signal input port; a four-to-one video multiplexer having four multiplexer video signal input ports and one multiplexer video signal output port, the multiplexer video signal output port being in transmitting connection with the video signal input port of the video recorder; an activation switch in electrical connection with the electronic record control input port of the video recorder; and a rear view mirror/camera assembly having four video cameras each with a wide angle fish-eye lens and a camera video signal output port in transmitting connection with one of the four multiplexer video signal input ports, one fish-eye lens being aimed toward the front of the vehicle, one fish-eye lens being aimed at the rear of the vehicle, one fish-eye lens being aimed at the driver seat portion of the passenger compartment, and one fish-eye lens being aimed at the front passenger seat portion of the passenger compartment, the four-to-one video multiplexer switching the camera video signals received at its four multiplexer video signal input ports sequentially to the multiplexer video signal output port in response to an activation signal from the activation switch to the video recorder control input port.

BACKGROUND OF THE INVENTION

Each year incidents occur in and around vehicles, such as accidents and traffic stops, that could be advantageously recorded for later viewing and analyzation. In addition, when a vehicle is broken into, it would be a great benefit to law enforcement personnel to have a video recording of the perpetrator breaking into the vehicle and stealing items from within the passenger compartment. It would be a benefit, therefore, to have a video recording system for recording events in and around a vehicle. Because it could be undesirable to have the video recording system on continuously, it would be a further benefit to have such a video recording system that could be a manually activated when desired by a user within the passenger compartment of the vehicle. Because the vehicle must often be left unattended, it would be further desirable to have such a video recording system that included an activation mechanism in a connection with an alarm output relay of an existing car alarm that would activate the recording system whenever the vehicle alarm system went off. Because one camera cannot adequately view all of the areas in and around the vehicle, it would also be an advantage to have such a video recording system that included multiple cameras.

SUMMARY OF THE INVENTION

It is thus an object of the invention to provide a multi-camera video recording system for vehicles that includes a video recorder and camera for recording events in and around a vehicle.

It is a further object of the invention to provide a multi-camera video recording system for vehicles that includes a manual activation switch for allowing a user to manually activate the video recording system from within the passenger compartment of the vehicle.

It is a still further object of the invention to provide a multi-camera video recording system for vehicles that includes an alarm linked activation mechanism in a connection with an alarm output relay of an existing car alarm that activates the recording system whenever the vehicle alarm system goes off.

It is a still further object of the invention to provide a multi-camera video recording system for vehicles that includes multiple cameras.

It is a still further object of the invention to provide a video recording system for vehicles that includes a video recorder having an electronic record control input port and a video signal input port; a four-to-one video multiplexer having four multiplexer video signal input ports and one multiplexer video signal output port, the multiplexer video signal output port being in transmitting connection with the video signal input port of the video recorder; an activation switch in electrical connection with the electronic record control input port of the video recorder; and a rear view mirror/camera assembly having four video cameras each with a wide angle fish-eye lens and a camera video signal output port in transmitting connection with one of the four multiplexer video signal input ports, one fish-eye lens being aimed toward the front of the vehicle, one fish-eye lens being aimed at the rear of the vehicle, one fish-eye lens being aimed at the driver seat portion of the passenger compartment, and one fish-eye lens being aimed at the front passenger seat portion of the passenger compartment, the four-to-one video multiplexer switching the camera video signals received at its four multiplexer video signal input ports sequentially to the multiplexer video signal output port in response to an activation signal from the activation switch to the video recorder control input port.

It is a still further object of the invention to provide a video recording system for vehicles that accomplishes some or all of the above objects in combination.

Accordingly, a video recording system for vehicles is provided. The video recording system includes a video recorder having an electronic record control input port and a video signal input port; a four-to-one video multiplexer having four multiplexer video signal input ports and one multiplexer video signal output port, the multiplexer video signal output port being in transmitting connection with the video signal input port of the video recorder; an activation switch in electrical connection with the electronic record control input port of the video recorder; and a rear view mirror/camera assembly having four video cameras each with a wide angle fish-eye lens and a camera video signal output port in transmitting connection with one of the four multiplexer video signal input ports, one fish-eye lens being aimed toward the front of the vehicle, one fish-eye lens being aimed at the rear of the vehicle, one fish-eye lens being aimed at the driver seat portion of the passenger compartment, and one fish-eye lens being aimed at the front passenger seat portion of the passenger compartment, the four-to-one video multiplexer switching the camera video signals received at its four multiplexer video signal input ports sequentially to the multiplexer video signal output port in response to an activation signal from the activation switch to the video recorder control input port.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 4 is a perspective view of the forward facing side of the rear view mirror/camera assembly of FIG. 2 showing the forwardly aimed fish-eye lens extending out from the mirror housing.

FIG. 5 is a perspective view of a representative vehicle showing the multi-camera video recording system for vehicles of the present invention installed with the video recorder and the four-to-one video multiplexer installed within the trunk compartment; the exemplary rear view mirror/camera assembly of FIG. 2 installed in place of the existing conventional rear view mirror of the representative vehicle; the foot activation switch installed on the floor board of the driver's side and in connection with the video recorder activation input port; and the alarm output relay of the vehicle alarm in connection with the video recorder activation input port.

DESCRIPTION OF THE EXEMPLARY EMBODIMENT

Figure 1:
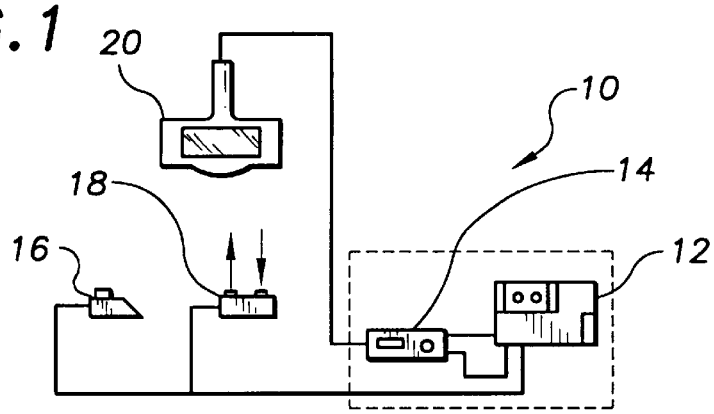
FIG. 1 is a schematic diagram of an exemplary embodiment of the multi-camera video recording system for vehicles of the present invention showing the video recorder, the four-to-one video multiplexer, the manual foot activation switch, the alarm activated switch, and the rear view mirror/camera assembly having four video cameras each with a wide angle fish-eye lens.
Figure 2:
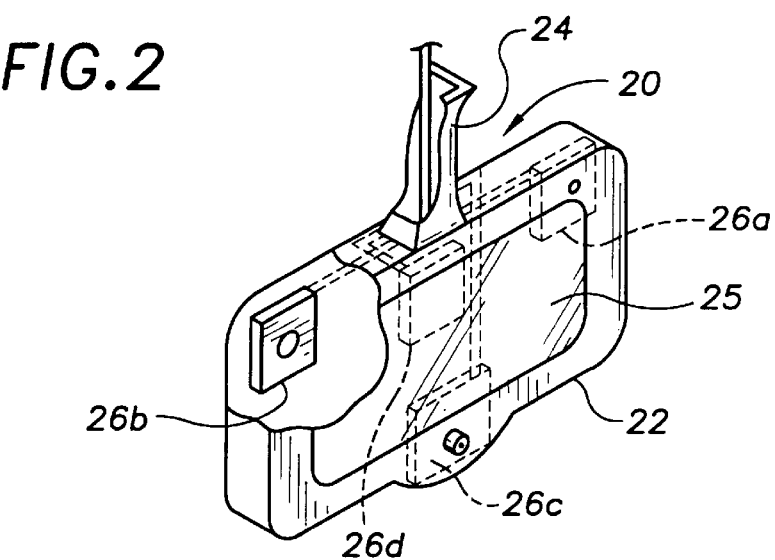
FIG. 2 is a partial cut-away view of the rear view mirror/camera assembly of the multi-camera video recorder system for vehicles of the present invention showing the four cameras mounted within the mirror housing.
Figure 3:
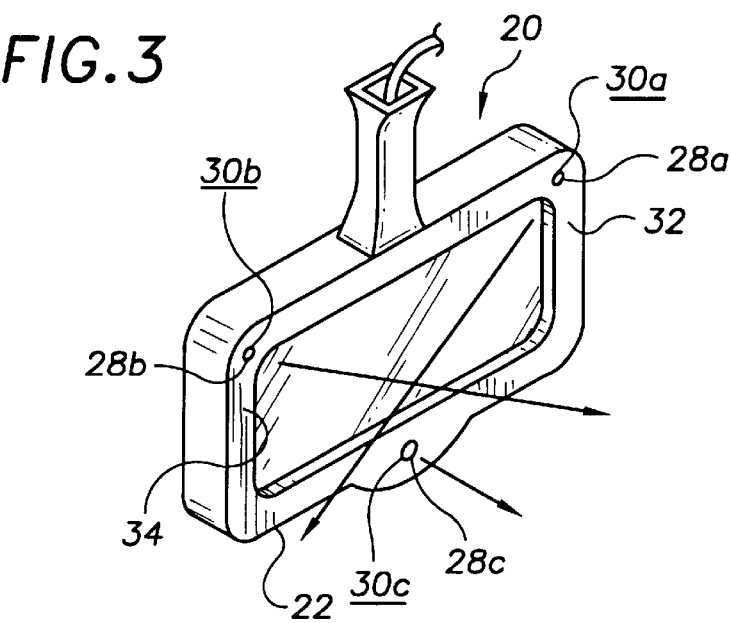
FIG. 3 is a perspective view of the driver facing surface of the rear view mirror/camera assembly of FIG. 2 showing the passenger seat aimed fish-eye lens mounted within the left contoured side of the mirror housing, the driver's seat aimed fish-eye lens mounted within the right contoured side of the mirror housing, the rearward aimed fish-eye lens extending from the bottom center of the mirror housing, the camera cables extending through the mirror mount structure, and the mirror.

FIG. 1 is a schematic diagram of an exemplary embodiment of the multi-camera video recording system for vehicles of the present invention, generally designated by the numeral 10. Recording system 10 includes a video recorder 12, a four-to-one video multiplexer 14, a manual foot activation switch 16, an alarm activated switch 18, and a rear view mirror/camera assembly 20. Video recorder 12 and four-to-one video multiplexer 14 are conventional video components operable from the vehicle power system as well as an auxiliary battery. Manual foot activation switch 16 is a conventional foot depressible electric switch. Alarm activation switch 18 is an alarm relay of a conventional vehicle alarm system. Referring to FIG. 2, rear view mirror/camera assembly 20 includes a hollow molded plastic housing 22; a hollow mirror mount structure 24; a mirror 25; and four conventional charge coupled device video cameras 26a,26b,26c,26d. With reference to FIG. 3, each of the four video cameras 26a,26b,26c,26d is mounted within plastic housing 22 and each is equipped with a fish-eye lens 28a,28b,28c,28d (28d shown in FIG. 4), respectively extending out through apertures 30a,30b,30c,30d (30d shown in FIG. 4) formed through plastic housing 22. When rear view mirror/camera assembly 20 is mounted in place of the existing rear view mirror of the vehicle during installation of the recording system 10, fish-eye lens 28a is aimed in the direction of the driver's seat, fish-eye lens 28b is aimed in the direction of the front passenger seat, fish-eye lens 28c is aimed directly backwards through the rear window of the vehicle, and with reference to FIG. 4, fish-eye lens 28d is aimed directly through the front windshield of the vehicle. Referring back to FIG. 3, fish-eye lens 28a is mounted through a first contoured upper housing corner 32 (also shown in FIG. 4) that is angled toward the driver's seat of the vehicle. Fish-eye lens 28b is mounted through a second contoured upper housing corner 34 (also shown in FIG. 4) that is angled toward the front passenger seat of the vehicle.

FIG. 5 illustrates installation of the multi-camera video recording system for vehicles 10 in a representative vehicle, generally designated by the numeral 40. Recording system 10 is installed by mounting video recorder 12 and four-to-one video multiplexer 14 within the trunk compartment 42 of vehicle 40. The existing rear view mirror assembly is then removed and replaced by rear view mirror/camera assembly 20; foot activation switch 16 is installed on the floor board of the driver's side and in connection with the video recorder activation input port; and alarm output relay 18 of the vehicle alarm system is wired in connection with the video recorder activation input port. Cabling from cameras 28a–d to four-to-one multiplexer 14 is accomplished by running cables through hollow mirror mount structure 24 (FIG. 3) and through the roof of the vehicle between the headliner and the roof structure to trunk compartment 42.

It can be seen from the preceding description that a multi-camera video recording system for vehicles has been provided that includes a video recorder and camera for recording events in and around a vehicle; that includes a manual activation switch for allowing a user to manually activate the video recording system from within the passenger compartment of the vehicle; that includes an alarm linked activation mechanism in a connection with an alarm output relay of an existing car alarm that activates the recording system whenever the vehicle alarm system goes off; that includes multiple cameras; and that includes a video recorder having an electronic record control input port and a video signal input port; a four-to-one video multiplexer having four multiplexer video signal input ports and one multiplexer video signal output port, the multiplexer video signal output port being in transmitting connection with the video signal input port of the video recorder; an activation switch in electrical connection with the electronic record control input port of the video recorder; and a rear view mirror/camera assembly having four video cameras each with a wide angle fish-eye lens and a camera video signal output port in transmitting connection with one of the four multiplexer video signal input ports, one fish-eye lens being aimed toward the front of the vehicle, one fish-eye lens being aimed at the rear of the vehicle, one fish-eye lens being aimed at the driver seat portion of the passenger compartment, and one fish-eye lens being aimed at the front passenger seat portion of the passenger compartment, the four-to-one video multiplexer switching the camera video signals received at its four multiplexer video signal input ports sequentially to the multiplexer video signal output port in response to an activation signal from the activation switch to the video recorder control input port.

It is noted that the embodiment of the multi-camera video recording system for vehicles described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A multi-camera video recording system for vehicles comprising:

a video recorder having an electronic record control input port and a video signal input port;

a four-to-one video multiplexer having four multiplexer video signal input ports and one multiplexer video signal output port, said multiplexer video signal output port being in transmitting connection with said video signal input port of said video recorder;

an activation switch in electrical connection with said electronic record control input port of said video recorder; and a rear view mirror/camera assembly having first, second, third, and fourth video cameras, each first, second, third, and fourth video camera having, respectively, a first second, third and fourth wide angle fish-eye lens and a first, second, third and fourth camera video signal output port in transmitting connection with one of said four multiplexer video signal input ports, said first fish-eye lens being aimed toward the front of said vehicle, said second fish-eye lens being aimed at the rear of said vehicle, said third fish-eye lens being aimed at the driver seat portion of the passenger compartment, and said fourth fish-eye lens being aimed at the front passenger seat portion of the passenger compartment, said four-to-one video multiplexer switching said camera video signals received at its four multiplexer video signal input ports sequentially to said multiplexer video signal output port in response to an activation signal from said activation switch to said video recorder control input port;

said rear view mirror/camera assembly including a hollow housing, a hollow mirror mount structure, a mirror; and four charge coupled device video cameras, each of said four video cameras being mounted within said hollow housing;

said first fish-eye lens being mounted through a first contoured upper housing corner of said hollow housing;

said second fish-eye lens being mounted through a second contoured upper housing corner of said hollow housing.

2. The multi-camera video recording system for vehicles of claim 1 wherein:

said activation switch is a foot activation switch installed on the floor board of a driver's side of a vehicle.

3. The multi-camera video recording system for vehicles of claim 1, wherein:

said activation switch is alarm output relay of a vehicle alarm system.

\* \* \* \* \*